(12) United States Patent
Koeda

(10) Patent No.: US 7,960,183 B2
(45) Date of Patent: Jun. 14, 2011

(54) BIOCHIP MANUFACTURING METHOD AND BIOCHIP MANUFACTURING DEVICE

(75) Inventor: Hiroshi Koeda, Suwa (JP)

(73) Assignee: Seiko Epson Corporation (JP)

( * ) Notice: Subject to any disclaimer, the term of this patent is extended or adjusted under 35 U.S.C. 154(b) by 725 days.

(21) Appl. No.: 11/497,736

(22) Filed: Aug. 2, 2006

(65) Prior Publication Data

US 2007/0048191 A1    Mar. 1, 2007

(30) Foreign Application Priority Data

Aug. 30, 2005   (JP) ................. 2005-248756

(51) Int. Cl.
    *G01N 1/10*    (2006.01)
(52) U.S. Cl. ........ 436/180; 422/547; 422/551; 422/552; 422/553; 435/6; 435/283.1; 435/287.2; 436/50; 436/47
(58) Field of Classification Search ........................ None
    See application file for complete search history.

(56) References Cited

U.S. PATENT DOCUMENTS

| 5,256,192 | A  | * | 10/1993 | Liu et al. ............... 106/31.15 |
| 5,601,980 | A  | * | 2/1997  | Gordon et al. ............ 435/6 |
| 6,551,557 | B1 | * | 4/2003  | Rose et al. ............... 422/502 |
| 6,592,826 | B1 | * | 7/2003  | Bloecker et al. ........... 422/101 |
| 6,818,400 | B2 | * | 11/2004 | Ito et al. ................. 435/6 |
| 6,998,230 | B1 | * | 2/2006  | Schantz et al. ............ 435/6 |
| 7,205,400 | B2 | * | 4/2007  | Webb ...................... 536/25.3 |

FOREIGN PATENT DOCUMENTS

| JP | 2-135865    | 11/1990 |
| JP | H09-278013  | 10/1997 |
| JP | 2001-324505 | 11/2001 |
| JP | 2003-149093 | 5/2003  |
| JP | 2004-160368 | 6/2004  |

OTHER PUBLICATIONS

Collins, John et al., "Microfluidic Flow Transducer Based on the Measurement of Electrical Admittance", Miniaturisation for Chemistry, Biology & Bioengineering, Lab Chip, 2004, 4, (Nov. 11, 2003), pp. 7-10.

* cited by examiner

*Primary Examiner* — Sally A Sakelaris
(74) *Attorney, Agent, or Firm* — Harness, Dickey & Pierce, P.L.C.

(57) ABSTRACT

Provided is a method of manufacturing a biochip using a droplet discharging device including a droplet discharging head having a cavity and a nozzle hole provided in communication with the cavity, and a liquid housing unit connected to the cavity via a passage, having the steps of filling a retention liquid which separates without getting mixed with the sample liquid into the liquid housing unit, the passage, and the cavity; injecting the sample liquid into the liquid housing unit; moving the sample liquid from the liquid housing unit to the cavity by discharging the retention liquid from the nozzle hole; stopping the discharge of the retention liquid at the moving step upon detecting with a sensor that the sample liquid reached a position adjacent to the nozzle hole; and delivering the sample liquid as droplets onto the object by discharging the sample liquid from the nozzle hole.

6 Claims, 6 Drawing Sheets

F I G. 5A
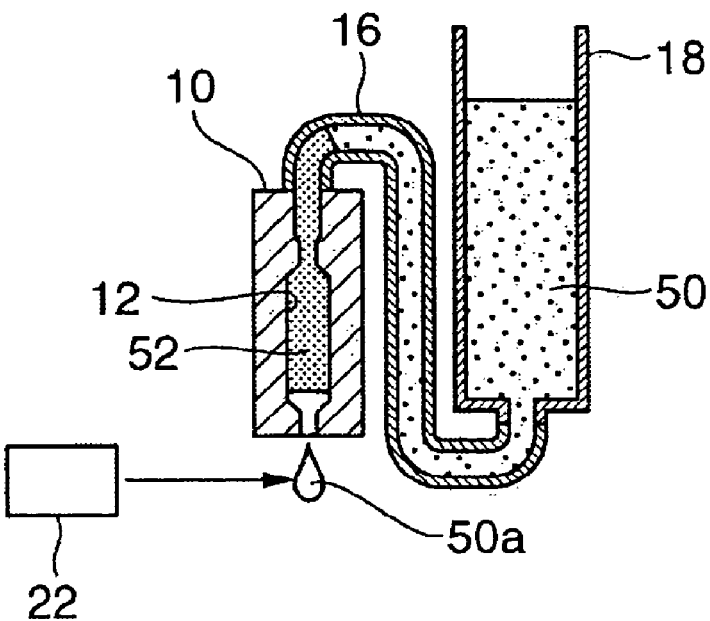
F I G. 5B
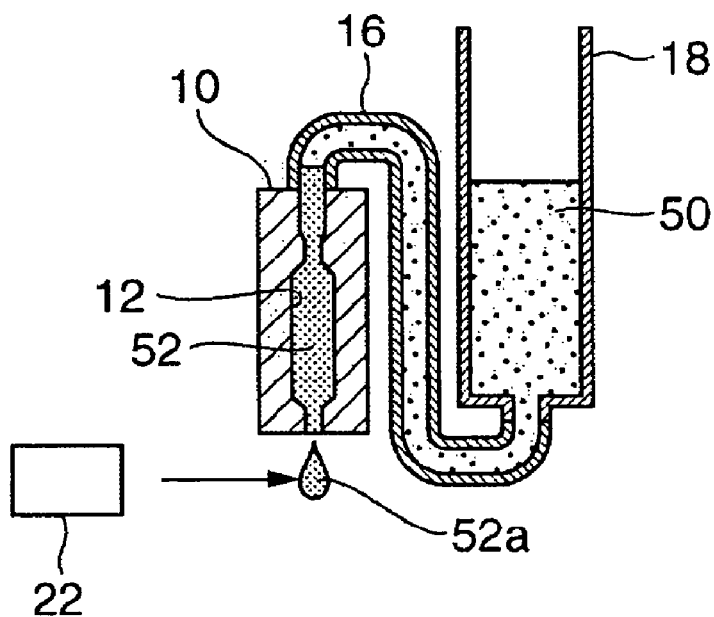

BIOCHIP MANUFACTURING METHOD AND BIOCHIP MANUFACTURING DEVICE

CROSS-REFERENCES

The entire disclosure of Japanese Patent Application No. 2005-248756 filed on Aug. 30, 2005 including specification, claims, drawings and summary are incorporated herein by reference in its entirety.

BACKGROUND

1. Technical Field

The present invention pertains to improved technology in the case of using a droplet discharging device for the manufacture of a so-called biochip in which a biological material is immobilized on an object such as a substrate.

2. Related Art

In recent years, so-called biochips (microarrays) formed by immobilizing a biological material such as DNA (nucleic acid), protein or antibody as the probe onto a substrate (chip) is attracting keen attention. Conventionally, biochips were manufactured by attaching a sample liquid containing DNA to the tip of a pin with a solid pin spotter, and transcribing this onto a chip. Nevertheless, this method had inconveniences such as contamination due to the contact with the spotter, low productivity and so on. Thus, the use of a droplet discharging device for manufacturing biochips in a non-contact and highly efficient manner is being considered.

Generally, biological materials such as nucleic acid used as the probe are often extremely expensive, and the obtained amount (absolute amount) for use in medical diagnosis and so on is usually small. Thus, when using a droplet discharging device for manufacturing a biochip, there is a technical task of avoiding as much as possible the waste of the sample liquid containing the biological material. In order to achieve the foregoing task, JP-A-2004-160368 discloses a small cartridge capable of stably retaining a sample liquid, even in small amounts, by using a bundle of a plurality of capillary tubes as the tank for storing the liquid containing the biological material.

Nevertheless, in the case of a droplet discharging head, when filling the sample liquid from the cartridge to the head through minute flow channels, there are inherent problems in that small amounts of waste fluid will arise due to the discharge of air bubbles, and residual liquid that could not be discharged will remain in the head even after the discharge. Thus, the foregoing problems could not be completely resolved even with the miniaturization of the cartridge as described above, and there is still room for improvement. Specifically, when filling the sample liquid in the droplet discharging head, a method of sucking the sample liquid from the nozzle hole (discharge opening) of the droplet discharging head with a suction pump is adopted. Here, even assuming that it is possible to stop the suction operation at the instant the sample liquid reaches the nozzle hole, since it is difficult to instantaneously eliminate the inertia of the sample liquid or the negative pressure of the suction pump, the sample liquid will continue to be discharged from the nozzle hole for a while after the suction operation is stopped. More realistically, air bubbles are engulfed in the sample liquid due to the sudden aspect change between the minute flow channels and the cavity (liquid housing chamber) in the droplet discharging head connected to such minute flow channels, and these air bubbles cause a defective discharge. Thus, in order to completely discharge the air bubbles, the suction operation is continued for a while after the sample liquid reaches the nozzle hole. Therefore, the current status is that large amounts of sample liquid are wasted as waste liquid.

SUMMARY

Accordingly, an advantage of some aspects of the invention is to provide manufacturing technology enabling the manufacture of biochips by avoiding as much as possible the waste of the sample liquid.

According to a first aspect of the invention, provided is a method of manufacturing a biochip using a droplet discharging device including a droplet discharging head having a cavity and a nozzle hole provided in communication with the cavity, and a liquid housing unit connected to the cavity via a flow channel, that delivers in drops a sample liquid containing a biological material onto a prescribed object from the nozzle hole of the droplet discharging head. This biochip manufacturing method includes the steps of filling a retention liquid that has roughly the same specific gravity as the sample liquid and which separates without getting mixed with the sample liquid into the liquid housing unit, the flow channel, and the cavity; injecting the sample liquid into the liquid housing unit; moving the sample liquid from the liquid housing unit to the cavity by discharging the retention liquid from the nozzle hole of the droplet discharging head; stopping the discharge of the retention liquid at the moving step upon detecting with a sensor that the sample liquid reached a position adjacent to the nozzle hole of the cavity; and delivering the sample liquid as droplets onto the object by disposing the droplet discharging head above the object and discharging the sample liquid from the nozzle hole.

According to a second aspect of the invention, provided is a method of manufacturing a biochip using a droplet discharging device including a droplet discharging head having a cavity and a nozzle hole provided in communication with the cavity, and a liquid housing unit connected to the cavity via a flow channel, that delivers in drops a sample liquid containing a biological material onto a prescribed object from the nozzle hole of the droplet discharging head. This biochip manufacturing method includes the steps of filling a retention liquid that has roughly the same specific gravity as the sample liquid and which separates without getting mixed with the sample liquid into the liquid housing unit, the flow channel, and the cavity; injecting the sample liquid into the liquid housing unit; moving the sample liquid from the liquid housing unit to the cavity by discharging the retention liquid from the nozzle hole of the droplet discharging head; stopping the discharge of the retention liquid at the moving step when the retention liquid is discharged in an amount that is roughly equal to the amount filled at the filling step; stopping the discharge operation of the droplet discharging head upon operating the droplet discharging head and detecting with a sensor that the liquid discharged from the nozzle hole changed from the retention liquid to the sample liquid; and delivering the sample liquid as droplets onto the object by disposing the droplet discharging head above the object and discharging the sample liquid from the nozzle hole.

According to the manufacturing method of the foregoing aspects, it is possible to replace the waste liquid, which is discharged until the sample liquid is sufficiently filled in the cavity, with a retention liquid by suitably selecting an inexpensive retention liquid. Therefore, it is possible to manufacture biochips by avoiding as much as possible the waste of the expensive and scarce sample liquid.

Further, the preferred conditions for the foregoing aspects in the invention are explained below.

Preferably, the sample liquid is a liquid with water as the solvent, and the retention liquid is an oily liquid. Contrarily, the sample liquid may be a liquid with oil as the solvent, and the retention liquid may be an aqueous liquid.

According to the above, it is possible to easily realize the combination of a sample liquid and a retention solution that get separated without getting mixed together.

Further, when the sample liquid contains a fluorescent material, the sensor may detect the fluorescence emitted by the fluorescent material.

When a fluorescent material is contained in the sample liquid to be used for manufacturing biochips, it is possible to easily detect the switching from the retention liquid to the sample liquid by using such fluorescent material.

Further, the sensor may include a pair of electrodes provided near the nozzle hole of the droplet discharging head, and detect the dielectric constant of the sample liquid or the retention liquid interposed between the electrodes.

Thereby, even if the sample liquid does not contain a fluorescent material, it is still possible to detect the switching from the retention liquid to the sample liquid.

According to a third aspect of the invention, provides is a device that manufactures a biochip by delivering in drops a sample liquid containing a biological material onto a prescribed object. This biochip manufacturing device includes a droplet discharging head having a cavity and a nozzle hole provided in communication with the cavity, and which discharges liquid from the nozzle hole according to a drive signal; a liquid housing unit connected to the cavity via a flow channel and which houses the sample liquid and a retention liquid that has roughly the same specific gravity as the sample liquid and which separates without getting mixed with the sample liquid; a table that supports the object; a drive unit that relatively moves the droplet discharging head and the table; and a sensor that detects that the sample liquid reached a position adjacent to the nozzle hole of the cavity.

According to the foregoing configuration, it is possible to replace the waste liquid, which is discharged until the sample liquid is sufficiently filled in the cavity, with a retention liquid by suitably selecting an inexpensive retention liquid. Therefore, it is possible to manufacture biochips by avoiding as much as possible the waste of the expensive and scarce sample liquid.

Preferably, the sensor detects the fluorescence emitted from a fluorescent material mixed into the sample liquid.

Since a fluorescent material is often contained in the sample liquid used for manufacturing biochips, it is possible to easily detect the switching from the retention liquid to the sample liquid by using such fluorescent material.

Further, the sensor may include a pair of electrodes provided near the nozzle hole of the droplet discharging head, and detect the dielectric constant of the sample liquid or the retention liquid interposed between the electrodes.

Thereby, even if the sample liquid does not contain a fluorescent material, it is still possible to detect the switching from the retention liquid to the sample liquid.

BRIEF DESCRIPTION OF THE DRAWINGS

FIG. 5A and FIG. 5B are diagrams explaining another configuration example of a fluorescent sensor.

DESCRIPTION OF EXEMPLARY EMBODIMENTS

Embodiments of the present invention are now explained with reference to the attached drawings.

Figure 1:
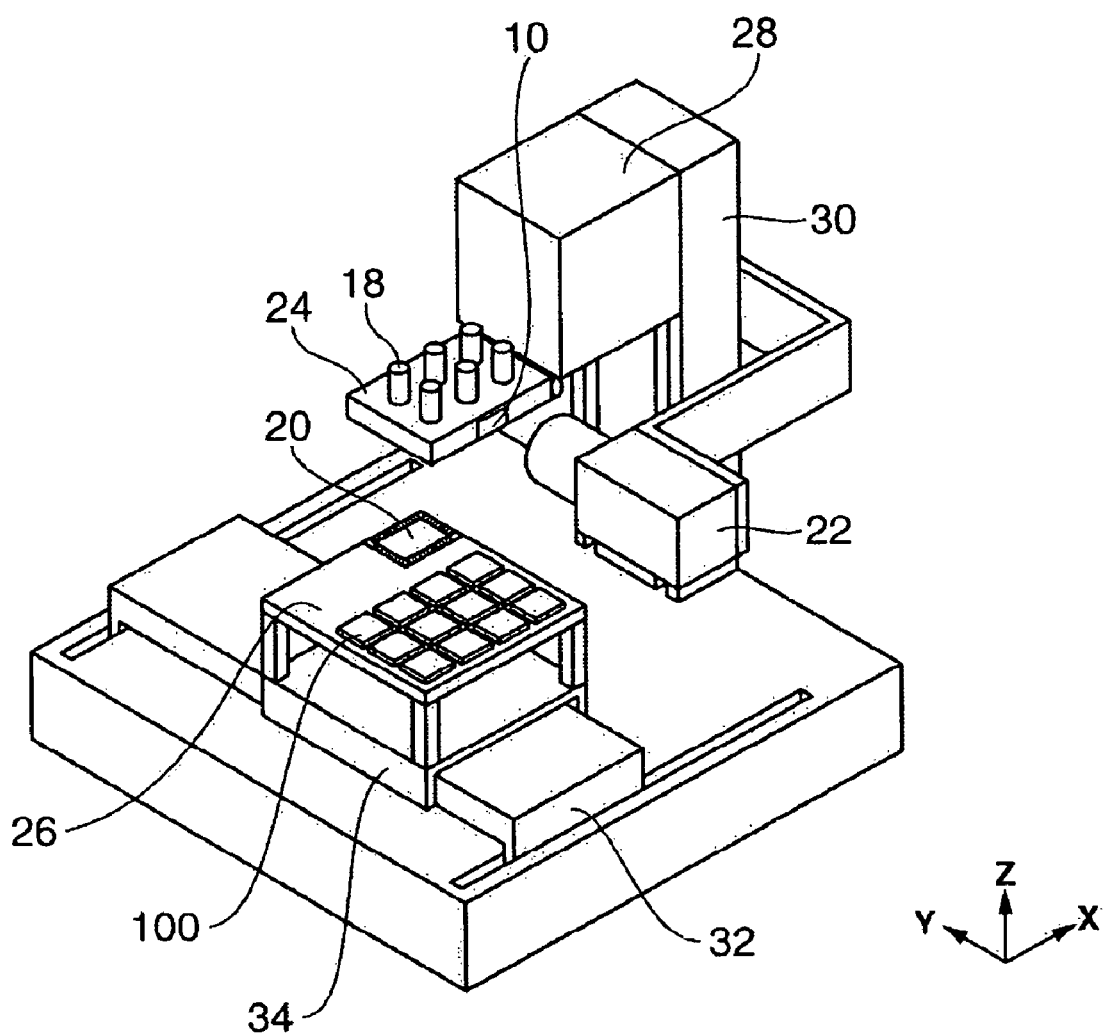
FIG. 1 is a schematic perspective view explaining the configuration of the biochip manufacturing device.

FIG. 1 is a schematic perspective view explaining the configuration of the biochip manufacturing device according to an embodiment of the present invention. The biochip manufacturing device 1 shown in FIG. 1 is used for manufacturing biochips by forming the sample liquid containing a biological material into droplets, and delivering such droplets onto a chip (object) 100 formed from a glass substrate. As shown in FIG. 1, the biochip manufacturing device 1 of this embodiment is configured by primarily including a droplet discharging head 10, a sample cartridge (liquid housing unit) 18, an aspiration unit 20, a fluorescent sensor 22, a flow channel plate 24, a table 26, a fixation unit 28, a Z-direction drive unit 30, an X-direction drive unit 32, and a Y-direction drive unit 34.

The droplet discharging head 10 discharges as droplets the liquid supplied from the sample cartridge according to a drive signal provided from a control unit not shown. Incidentally, the detailed configuration of the droplet discharging head 10 will be described later.

The sample cartridge 18 is connected to the droplet discharging head 10 via the flow channel plate 24, and houses the liquid to be discharged to the droplet discharging head 10 as the discharge target. According to this embodiment, the sample cartridge 18 houses the sample liquid and a retention liquid that has roughly the same specific gravity as the sample liquid and which separates without getting mixed with the sample liquid. Incidentally, the relationship of the sample liquid and the retention liquid will be described later.

The aspiration unit 20 is provided at the corner of the table 26, and is used for filling the liquid as the discharge target in the droplet discharging head 10. Specifically, the droplet discharging head 10 is disposed such that the nozzle hole forming face comes in contact with the suction cap of the aspiration unit 20, and, by operating the suction pump (not shown) connected to the suction cap, the liquid inside the droplet discharging head 10 is sucked and discharged. Further, the aspiration unit 20 also has the function of receiving the discharged liquid (waste liquid).

The fluorescent sensor 22 is configured by including a CCD camera and the like, and is used for detecting that the sample liquid reached the vicinity of the nozzle hole of the droplet discharging head 10. Specifically, the sample liquid of this embodiment contains a fluorescent material, and the fluorescent sensor 22 detects that the sample liquid reached the vicinity of the nozzle hole by observing the fluorescence emitted from the fluorescent material near the nozzle hole. Incidentally, details regarding the detection operation of the fluorescent sensor 22 will be described later.

The flow channel plate 24 is a tabular member having a groove or a through-hole of a prescribed shape, and is used for configuring a flow channel 16 (refer to FIG. 3 described later) interposed between the droplet discharging head 10 and the sample cartridge 12 for passing the sample liquid and the like.

The table 26 supports a plurality of chips 100 as the object. As shown in FIG. 1, the table 26 is mounted on the Y-direction drive unit 34.

The fixation unit 28 is used for fixing the droplet discharging head 10, the sample cartridge 18 and the flow channel plate 24 on the Z-direction drive unit 30.

The Y-direction drive unit 34 is used for freely moving the table 26 in the Y direction shown in FIG. 1. Similarly, the X-direction drive unit 32 is used for freely moving the table 26 in the X direction shown in FIG. 1. In this example, the table 26 and the Y-direction drive unit 34 are mounted on the X-direction drive unit 32, and these are configured to be movable in the X direction as a whole. Further, the Z-direction drive unit 30 is used for freely moving the fixation unit 28 and the droplet discharging head 10 fixed to the fixation unit 28 in the Z direction shown in FIG. 1. A control unit not shown supplies a drive signal to the Z-direction drive unit 30, the X-direction drive unit 32 and the Y-direction drive unit 34, respectively. With the biochip manufacturing device 1 of this embodiment, the droplet discharging head 10 is moved relatively to the table 26 by appropriately operating the Z-direction drive unit 30, the X-direction drive unit 32 and the Y-direction drive unit 34, and discharges an appropriate amount of the sample liquid at a suitable position on the chip 100 in order to manufacture a biochip. In other words, in this embodiment, the Z-direction drive unit 30, the X-direction drive unit 32 and the Y-direction drive unit 34 correspond to the "drive unit" of the invention.

Figure 2A:
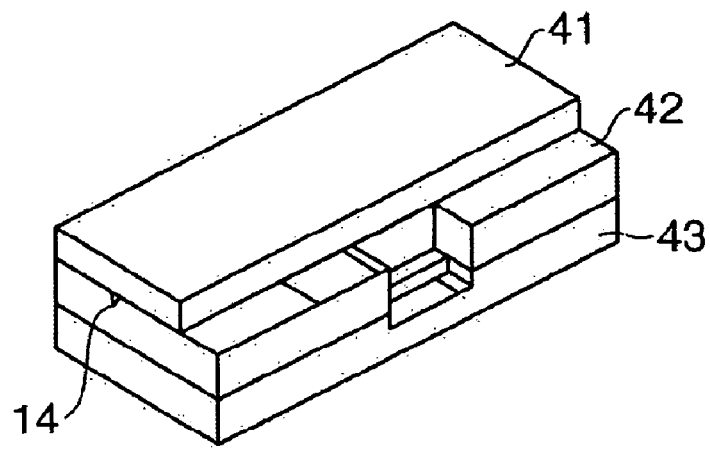
FIG. 2A and FIG. 2B are diagrams explaining the detailed configuration of the droplet discharging head.
Figure 2B:
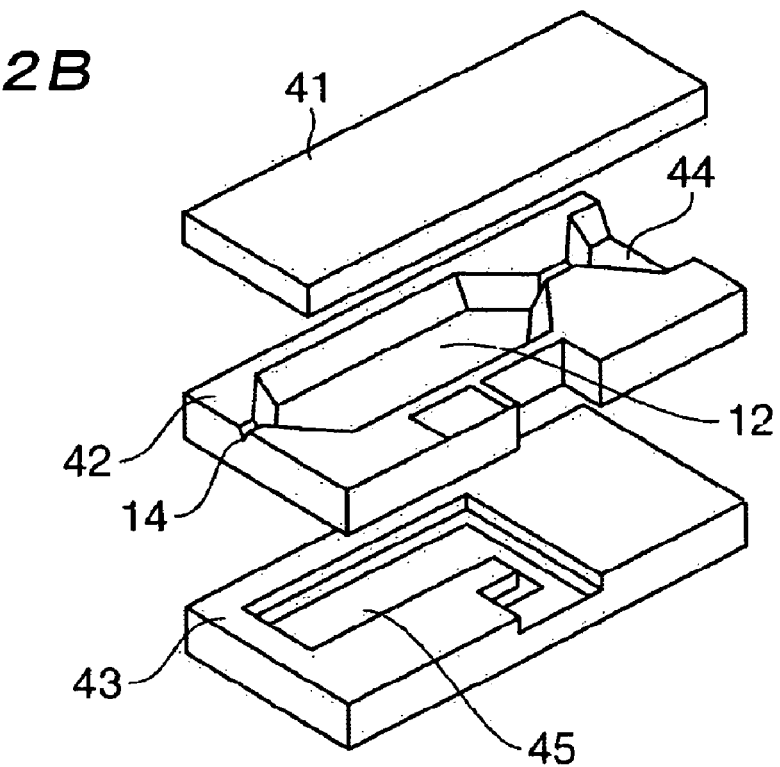

FIG. 2 is a diagram explaining the detailed configuration of the droplet discharging head 10. More specifically, FIG. 2A is a perspective view of the droplet discharging head 10, and FIG. 2B is an exploded perspective view of the droplet discharging head 10. The illustrated droplet discharging head 10 is an electrostatically driven droplet discharging head, and is configured by affixing together a cover glass 41, a compression chamber substrate 42 and an electrode substrate 43. The compression chamber substrate 42 is formed so that a reception opening 44 of the liquid supplied from the sample cartridge 12 via the flow channel, the cavity (compression chamber) 12 and the nozzle hole 14 are in communication. A diaphragm is provided to a part of the wall surface of the cavity 12. The electrode substrate 43 has a counter electrode 45 placed opposite the diaphragm of the cavity 12 by maintaining a gap of a prescribed spacing. When a potential difference is applied to the diaphragm and the counter electrode 45, the diaphragm will be subject to elastic deformation and be gravitated toward the counter electrode 45, and negative pressure will be applied to the cavity 12. Thereafter, when the potential difference between the diaphragm and the counter electrode 45 is released, a minute amount of liquid in the cavity 12 is discharged from the nozzle 14 due to the restoring force of the diaphragm.

The biochip manufacturing device 1 of this embodiment is configured as described above, and the method of using this biochip manufacturing device 1 to manufacture a biochip by delivering in drops a sample liquid containing a biological material onto the chip 100 is now explained in detail.

Here, before describing this manufacturing method, the sample liquid and retention liquid used in this embodiment are explained. As described above, a retention liquid that has roughly the same specific gravity as the sample liquid and which separates without getting mixed with the sample liquid is used. For example, if the sample liquid is a liquid (aqueous solution) with water as the solvent, an oily liquid can be used as the retention liquid. As the retention liquid to be used in the foregoing case; for instance, vegetable oil in liquid form at room temperature is preferably used. Specifically, vegetable oil having palmitoleic acid, oleic acid, linoleic acid, α-linoleic acid, arachidonic acid, eicosapentaenoic acid, docosahexaenoic acid, inolenic acid, or the like as its primary component is preferably used. Further, if the sample liquid is a liquid with oil as the solvent, an aqueous liquid can be used as the retention liquid. As the retention liquid to be used in the foregoing case, water or a solution containing a suitable substance can be used.

FIG. 3 and FIG. 4 are diagrams explaining the biochip manufacturing method. For the sake of convenience in explaining the invention, the respective drawings represent a simplified configuration of the droplet discharging head 10, the sample cartridge 18 and other components.

Figure 3A:
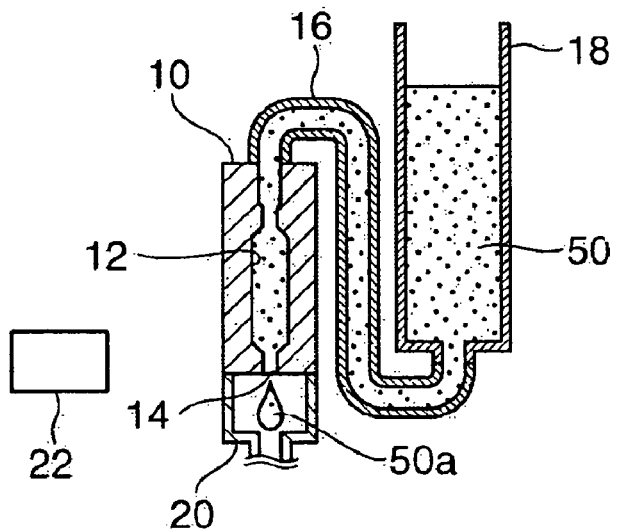
FIG. 3A to FIG. 3C are diagrams explaining the manufacturing method of a biochip.

Foremost, a retention liquid 50 is filled in the sample cartridge 18, the flow channel 16, and the cavity 12 of the droplet discharging head 10 (FIG. 3A). Specifically, as described above, the droplet discharging head 10 is disposed such that the forming face of the nozzle hole 14 comes in contact with the aspiration unit 20 so as to operate the suction pump (not shown) connected to the aspiration unit 20. Thereby, the retention liquid 50 is sucked via the nozzle hole 14 of the droplet discharging head 10, and the retention liquid 50 housed in the sample cartridge 18 is also filled in the flow channel 16 and the cavity 12. Thereupon, the waste liquid 50a resulting from such suction is discharged into the aspiration unit 20.

Figure 3B:
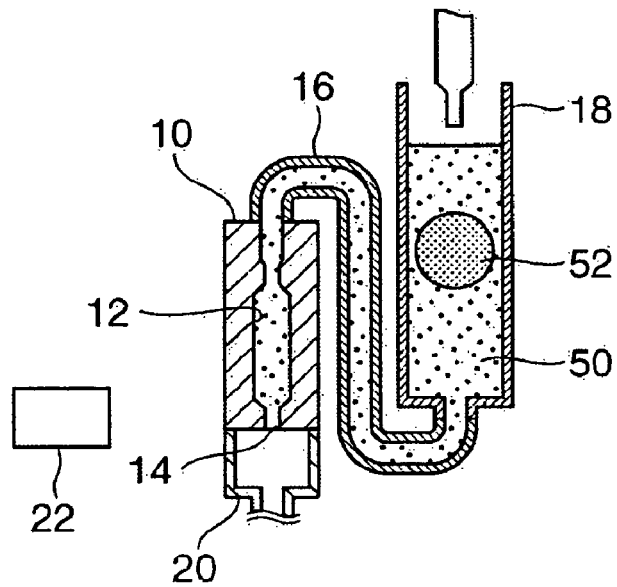

Subsequently, a suitable amount of the sample liquid 52 is injected into the sample cartridge 18 using a dispenser or the like (FIG. 3B). Here, the sample liquid 52 and the retention liquid 50 are maintaining a mutually separated state in the sample cartridge 18. As shown in drawings, in this embodiment, the retention liquid 50 exists at the periphery of the sample liquid 52, and since the sample liquid 52 maintains a state of not coming in direct contact with the outside world (air, etc.), it is possible to inhibit the deterioration or the like of the sample liquid 52.

Figure 3C:
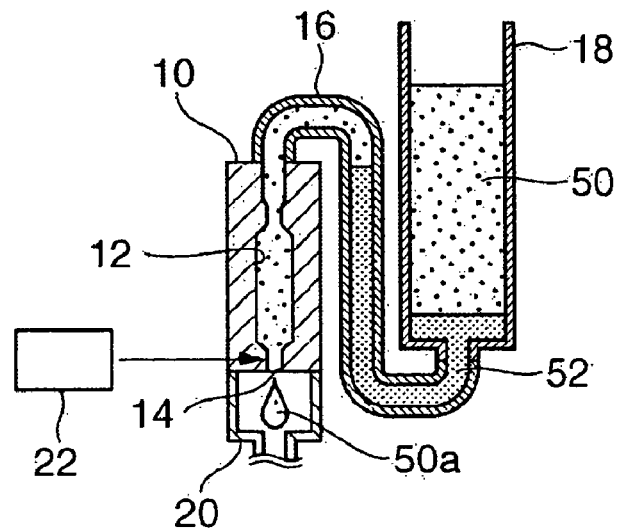
Figure 4A:
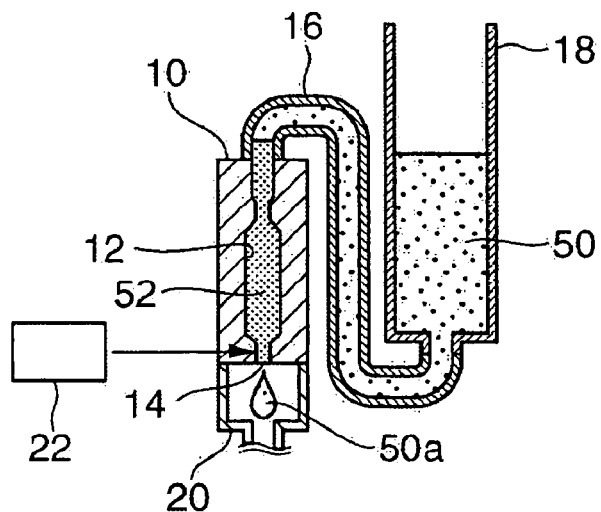
FIG. 4A to FIG. 4C are diagrams explaining the manufacturing method of a biochip.

Subsequently, the sample liquid 52 is moved from the sample cartridge 18 to the cavity 12 by discharging the retention liquid 50 from the nozzle hole 14 of the droplet discharging head 10 (FIG. 3C, FIG. 4A). Specifically, the droplet discharging head 10 is disposed such that the forming face of the nozzle hole 14 comes in contact with the aspiration unit 20 so as to operate the suction pump (not shown) connected to the aspiration unit 20. Thereby, the retention liquid 50 is sucked via the nozzle hole 14 of the droplet discharging head 10, and the retention liquid 50 housed in the sample cartridge 18 passes through the flow channel 16 and the cavity 12, and is discharged as the waste liquid 50a. Since the retention liquid 50 and the sample liquid 52 are roughly of the same specific gravity, together with the discharge of the retention liquid 50, the sample liquid 52 also passes through the flow channel 16 and arrives at the cavity 12 as illustrated in the drawings.

Incidentally, although the sample liquid 52 may be moved as a result of making the droplet discharging head 10 performing the operation of discharging the retention liquid 50 in the foregoing process, the foregoing suction method is more preferable from the perspective of shortening the time required for the process.

Figure 4B:
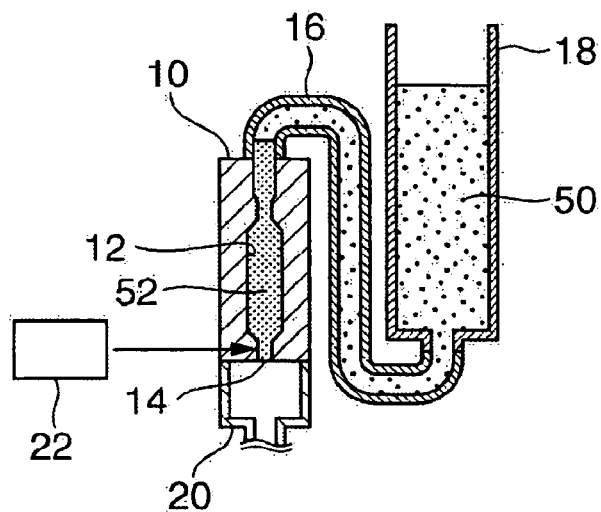

Further, in parallel with the foregoing process (refer to FIG. 3C, FIG. 4A), the fluorescent sensor 22 is used to observe the vicinity of the nozzle hole 14 of the droplet discharging head 10. Specifically, as shown in FIG. 3C, FIG. 4A and FIG. 4B, with the droplet discharging head 10 of this embodiment, it is possible to observe the vicinity of the nozzle hole 14 with the fluorescent sensor 22 through a transparent cover glass 41. When the sample liquid 52 reaches a position adjacent to the nozzle hole 14 of the cavity 12, the fluorescence emitted from the fluorescent material contained in the sample liquid 52 is detected by the fluorescent sensor 22, and the discharge of the retention liquid 50 described above is stopped (FIG. 4B). Specifically, a detection signal from the fluorescent sensor 22 is input to a control unit not shown, and the control unit stops the suction operation of the aspiration unit 20.

Figure 4C:
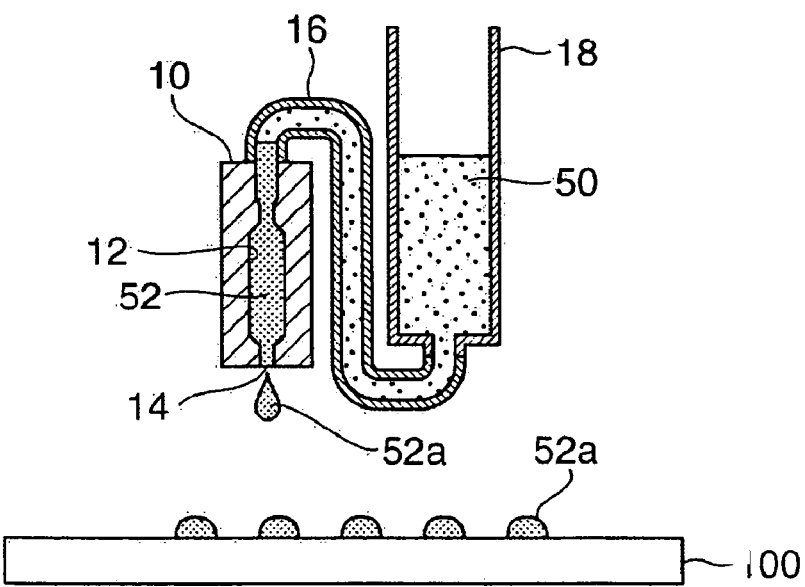

Subsequently, the droplet discharging head 10 is disposed above the chip 100 as the object, and the sample liquid 52 is discharged from the nozzle hole 14 and delivered as drops onto the chip 100 (FIG. 4C). Thereby, it is possible to obtain a biochip in which the droplets 52a discharged from the droplet discharging head 10 are aligned on the chip 100.

FIG. 5 is a diagram explaining another configuration example of the fluorescent sensor 22. When the droplet discharging head 10 is configured from an opaque material and it is difficult to observe the vicinity of the nozzle hole 14, the fluorescent sensor 22 should be disposed so that the liquid discharged from the nozzle hole 14 can be observed as shown in the drawings. In this case, as with the foregoing embodiment, the retention liquid 50 is discharged by disposing the droplet discharging head 10 such that it comes in contact with the aspiration unit 20 so as to operate the suction pump (not shown) connected to the aspiration unit 20. Here, the suction pump is stopped at the point when the retention liquid 50 in an amount that is roughly equal to the amount filled in the sample cartridge 12 (refer to FIG. 3A) is discharged so as to stop the discharge of the retention liquid 50. Subsequently, as shown in FIG. 5A and FIG. 5B, when the droplet discharging head 10 is operated and the fluorescent sensor 22 detects that the droplet discharged from the nozzle hole has changed from the droplet 50a of the retention liquid 50 to the droplet 50a of the sample liquid 52, the discharge operation of the droplet discharging head 10 is stopped. Incidentally, in the illustrated example, although the configuration enables the droplet discharged from the nozzle holes 14 to be immediately observed with the fluorescent sensor 22, the configuration may also be such that the droplet is delivered and attached to a suitable location (on a dummy chip, for instance), and the attached droplet is observed with the fluorescent sensor 22.

With this embodiment described above, it is possible to replace the waste liquid, which is discharged until the sample liquid 52 is sufficiently filled in the cavity, with a retention liquid by suitably selecting an inexpensive retention liquid 50. Therefore, it is possible to manufacture biochips by avoiding as much as possible the waste of the expensive and scarce sample liquid.

Incidentally, the present invention is not limited to the subject matter of the embodiments described above, and may be implemented in various modifications within the scope of the gist of the invention. For instance, in the foregoing embodiments, although a case was assumed where a fluorescent material is contained in the sample liquid and the fluorescent sensor 22 for detecting the fluorescence emitted from the fluorescent material was used, a sensor employing other principles may also be adopted.

Figure 6:
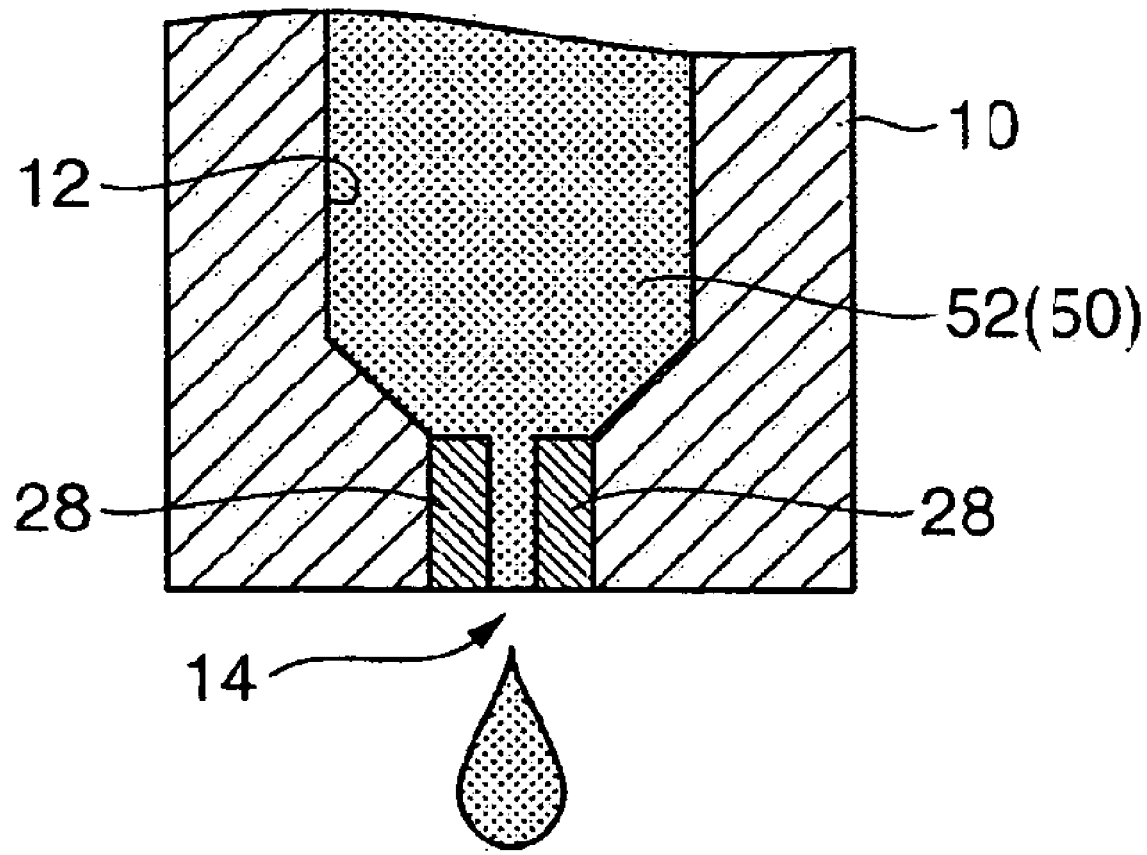
FIG. 6 is a diagram explaining another configuration example of a sensor.

FIG. 6 is a diagram explaining another configuration example of the sensor, and shows a partial cross section in the vicinity of the nozzle hole of the droplet discharging head 10. The sensor shown in FIG. 6 is configured by including a pair of electrodes 28 provided to the vicinity of the nozzle hole 14 of the droplet discharging head 10. When the sample liquid 52 or the retention liquid 50 passes through the pair of electrodes 28, the sample liquid 52 or the retention liquid 50 will be interposed between the electrodes. Here, by applying a faint voltage between the electrodes and detecting the capacitance, it is possible to detect the dielectric constant of the sample liquid 52 or the retention liquid 50. Since there will be a difference in the detected value of the dielectric constant due to the difference in the solvent used in the sample liquid 52 and the retention liquid 50, it is possible to detect changes in the liquid discharged from the nozzle hole 14 of the droplet discharging head 10 based on such difference. Incidentally, the pair of electrodes 28 may also be provided in the cavity 12, and not in the vicinity of the nozzle hole 14. In addition, a sensor for detecting the difference in optical characteristics (transmission, reflectivity, etc.) of the sample liquid 52 of the retention liquid 50 can also be used. In this case, for instance, it would be preferable to perform treatment such as mixing a suitable pigment to the retention liquid 50 in order to further distinguish the difference in optical characteristics of the retention liquid 50 and the sample liquid 52. Further, a method of including a radioisotope such as a hydrogen isotope in the sample liquid 52 or the retention liquid 50 and using a sensor to detect the radiation emitted therefrom, or a method of including a magnetic material in the sample liquid 52 or the retention liquid 50 and using a sensor to detect the magnetic line emitted therefrom may also be adopted.

Moreover, in the foregoing embodiments, although a case was illustrated using an electrostatically driven droplet discharging head, a droplet discharging head of a different system (for instance, a piezo system or air bubble system) may also be adopted.

Further, in the foregoing embodiment, although the focus of attention was on a biochip manufacturing device and a biochip manufacturing method, the present invention can also be applied to the manufacture of electronic devices such as an organic electroluminescence device or an organic thin film transistor by using the droplet discharging device. In this case, it is possible to reduce the usage of the expensive liquid material used in forming the elements.

What is claimed is:

1. A method of manufacturing a biochip using a droplet discharging device including a droplet discharging head having a cavity and a nozzle hole provided in communication with the cavity, and a liquid housing unit connected to the cavity via a flow channel, that delivers in drops a sample liquid containing a biological material onto a prescribed object from the nozzle hole of the droplet discharging head, comprising the steps of:
    filling a retention liquid that has roughly the same specific gravity as the sample liquid and which separates without getting mixed with the sample liquid into the liquid housing unit, the flow channel, and the cavity;
    injecting the sample liquid into the liquid housing unit;
    moving the sample liquid from the liquid housing unit to the cavity by discharging the retention liquid by sucking the retention liquid out of the droplet discharging head using an aspiration unit connected to the nozzle hole, the aspiration unit comprising a suction cap and a vacuum pump connected to the suction cap, the suction cap being constructed to be attachable to a forming surface on which the nozzle hole of the drop discharging head is formed, and to suction the retention liquid out through the nozzle hole;
    stopping the discharge of the retention liquid upon detecting with a sensor that the sample liquid has reached a position adjacent to the nozzle hole of the cavity;
    disconnecting the aspiration unit from the nozzle;
    moving the droplet discharging head above the object; and
    delivering the sample liquid as droplets onto the object by discharging the sample liquid from the nozzle hole.

2. A method of manufacturing a biochip using a droplet discharging device including a droplet discharging head having a cavity and a nozzle hole provided in communication with the cavity, and a liquid housing unit connected to the cavity via a flow channel, that delivers in drops a sample liquid containing a biological material onto a prescribed object from the nozzle hole of the droplet discharging head, comprising the steps of:

filling a retention liquid that has roughly the same specific gravity as the sample liquid and which separates without getting mixed with the sample liquid into the liquid housing unit, the flow channel, and the cavity;

injecting the sample liquid into the liquid housing unit;

moving the sample liquid from the liquid housing unit to the cavity by discharging the retention liquid by sucking the retention liquid out of the droplet discharging head using an aspiration unit connected to the nozzle hole, the aspiration unit comprising a suction cap and a vacuum pump connected to the suction cap, the suction cap being constructed to be attachable to a forming surface on which the nozzle hole of the drop discharging head is formed, and to suction the retention liquid out through the nozzle hole;

stopping the discharge of the retention liquid at the moving step when the retention liquid is discharged in an amount that is roughly equal to the amount filled at the filling step;

stopping the discharge operation of the droplet discharging head upon operating the droplet discharging head and detecting with a sensor that the liquid discharged from the nozzle hole changed from the retention liquid to the sample liquid;

disconnecting the aspiration unit from the nozzle;

moving the droplet discharging head above the object; and delivering the sample liquid as droplets onto the object by discharging the sample liquid from the nozzle hole.

3. The manufacturing method of a biochip according to claim 1, wherein the sample liquid is the liquid with water as the solvent, and the retention liquid is a vegetable oil.

4. The manufacturing method of a biochip according to claim 1, wherein the sample liquid is the liquid with oil as the solvent, and the retention liquid is an aqueous liquid.

5. The manufacturing method of a biochip according to claim 1, wherein the sample liquid contains a fluorescent material, and the sensor detects the fluorescence emitted by the fluorescent material.

6. The manufacturing method of a biochip according to claim 1, wherein the sensor includes a pair of electrodes provided near the nozzle hole of the droplet discharging head, and detects the dielectric constant of the sample liquid or the retention liquid interposed between the electrodes.

* * * * *